Jan. 12, 1971   E. P. BULLWINKEL ET AL   3,555,377
CAPACITOR HAVING TALC SCAVENGER
Filed Aug. 1, 1969
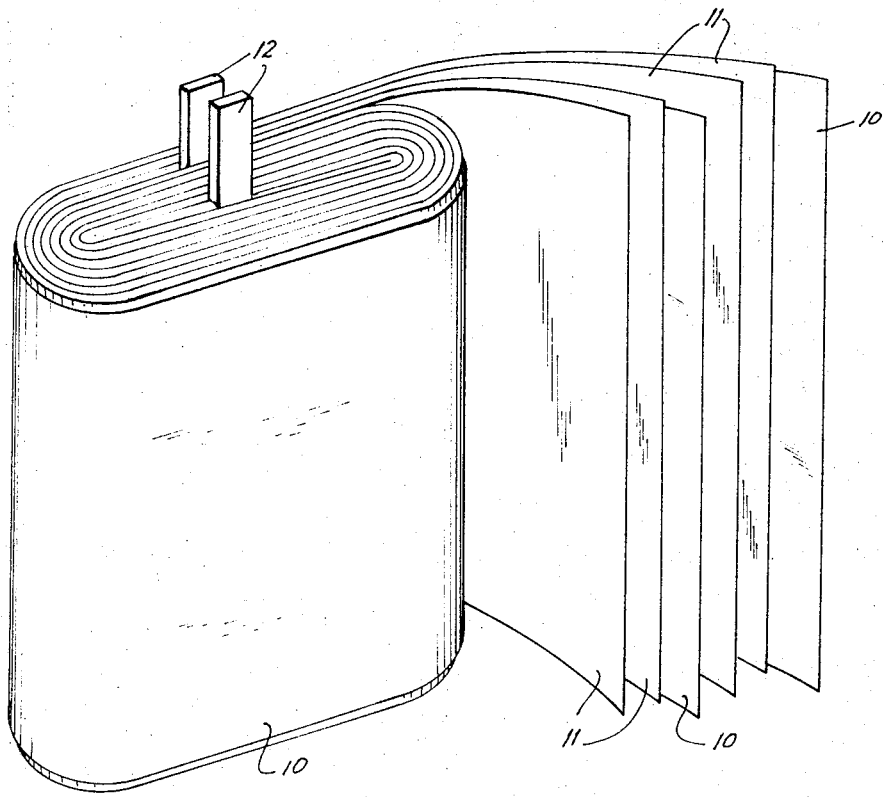
INVENTORS:
EDWARD P. BULLWINKEL
WILLIAM A. SELKE
BY
*Breitenfeld & Levine*
ATTORNEYS United States Patent Office 3,555,377
Patented Jan. 12, 1971

3,555,377
CAPACITOR HAVING TALC SCAVENGER
Edward P. Bullwinkel, Interlaken, and William A. Selke, Stockbridge, Mass., assignors to Kimberly-Clark Corporation, a corporation of Delaware
Filed Aug. 1, 1969, Ser. No. 846,947
Int. Cl. H01g 3/11
U.S. Cl. 317—259       2 Claims

ABSTRACT OF THE DISCLOSURE

Impregnated paper-dielectric capacitor contains talc as an adsorbent scavenger for ionic constituents in the impregnant. The talc may form part of the dielectric paper, in which case it constitutes from 0.1% to 8% by weight of the main papermaking fibers. The talc may form part of paper wrapper for wound capacitor body, in which case it constitutes between 6% and 30% by weight of the main papermaking fibers.

---

This invention relates generally to paper, and has particular reference to paper intended for use in electrical capacitors in which the paper is immersed in a dielectric impregnant, usually a chlorinated hydrocarbon.

Coordinately, the invention relates to capacitors employing such paper.

A general objective is to improve the performance and life characteristics of capacitors of the type referred to, by inactivating organic ionic constituents that may be present in the impregnating medium. Such constituents may originate in the paper itself, since they are present to some degree in the wood pulp from which the paper is made, or they may enter the capacitor during the course of manufacture, or may stem from degradation products formed during normal service aging of the paper or of the impregnant employed.

A more particular object of the invention is to provide paper which embodies within itself, as component parts of its fibrous structure, an inorganic filler having the ability to adsorb the ionic constituents to be inactivated.

The invention is predicated upon the discovery that talc is uniquely adapted to serve as an effective adsorbent of the character referred to. It is a finely divided material well suited to become an integrated part of a paper web; its presence in the paper in relatively small amounts is sufficient to improve the life characteristics, and reduce the dissipation factor, especially at low stress and elevated temperature of capacitors in which the paper is employed. When used in selected small amounts lying within prescribed ranges the beneficial effects manifest themselves to maximum advantage without serious adverse effect on the dielectric strength or mechanical properties of the paper.

Paper incorporating the scavenging talc additive can be used as a dielectric between foils or electrodes of the capacitor, or as a wrapper surrounding the capacitor body. In the former case, the additive is most efficient when it constitutes from 0.1% to 8.0% by weight of the main cellulosic papermaking fibers. In the wrapper, the optimum range is between 6% and 30%.

Paper of the improved kind is intended primarily for capacitors of the "paper dielectric" type in which strips of tissue are interwound with strips of conductive foil to form a condenser body which is subjected to heat and vacuum, then impregnated with a dielectric liquid substance, usually a chlorinated hydrocarbon of the "askarel" variety, sometimes hydrocarbon oil, and possibly mixtures with sulfones. The operating and performance characteristics of such a capacitor can be markedly improved by inactivating ions in the impregnating medium.

Adsorbents heretofore proposed for the purpose, e.g., substances such as oxides and hydroxides of magnesium, aluminum, silicon, and titanium, are relatively high in cost, and appreciable amounts must be used in order to provide required adsorption. The use of a large proportion of inorganic material in the paper-making stock is undesirable since it tends to impair dielectric strength.

By means of the present invention these difficulties are overcome. Talc is relatively low in cost and a suitable adsorbent. Moreover the employment of this material, in an appropriately selected small proportion as an integral minor particulate component of a paper web, does not impair either its dielectric or tensile strength; and it permits the improved paper to be manufactured by conventional techniques on a practicable and economical commercial basis. The scavenging effect of the talc contributes markedly to a reduction in the dissipation factor of a capacitor in which the paper is used. The term dissipation factor, as used in relation to a capacitor, is the proportion of in-phase current flowing through the capacitor. In-phase current induces power loss producing undesirable heat and the objective is to reduce it to as low a percentage as possible.

The drawing is a perspective view of an illustrative wound capacitor body incorporating the present invention.

Only small proportions of the talc additive are required. When the paper is utilized in the dielectric of the capacitor, talc utilized in a relatively minute amount e.g., as low as 0.1% by weight, of the main paper fibers, is able to inactivate ions in the impregnating medium to a degree which materially reduces the power factor losses of the capacitor, and keeps these losses low even after long periods of use. When utilized in wrapper paper, the talc is most effective when present in an amount not exceeding 30% by weight, of the main fibers of which the wrapper sheet is composed.

If abrasive minerals are incorporated in a papermaking slurry, the papermaking equipment, especially the endless wire screen on which the paper is formed, is subjected to accelerated wear. Talc, however, is exceptionally soft (having a hardness of one on the Mohs mineral hardness scale), and so has an advantage over other, more abrasive minerals.

The dissipation factor of a capacitor subjected to alternating current is composed of the sum of the dissipation factors of the dielectric tissue and the liquid phase or impregnant. Losses contributed by the paper dielectric are inherent in its composition as a result of the dipole relaxation mechanism causing in-phase power losses. Dissipation factor losses contributed by the liquid phase occur from the presence of soluble ionic materials which conduct current. The addition of inorganic adsorbents to the paper dielectric will remove these liquid phase constituents.

The adsorptive effectiveness of talc has been verified by a special test designed for that purpose. In carrying out this test, an epoxide, in particular dipentene dioxide, is first added to Aroclor 1242 (Monsanto's trademark for trichlorobiphenyl) in an amount equal to 0.7% by weight. The addition of dipentene dioxide is in keeping with the proposal for its use in the dielectric liquid as referred to in U.S. Pat. No. 3,242,401. When this material is added to Aroclor it raises the dissipation factor of the mixture. One milliliter of this solution is then used to impregnate a four mil thickness pad of previously dried capacitor tissue containing the solid adsorbent, and the dissipation factor measured at 100° C. with 25 volts/mil applied. As a control, a test was made with capacitor tissue without any adsorbent additive. The succeeding table sets forth the results.

TABLE I

| Test specimen: | Percent dissipation factor at 100° C. |
|---|---|
| Tissue without adsorbent | 0.79 |
| Tissue with 3.4% talc | 0.40 |
| Tissue with 1.6% talc | 0.41 |
| Tissue with 3% fumed alumina | 0.60 |
| Tissue with 2.5% fumed alumina | 0.71 |

Talc is therefore demonstrated to be more effective than fumed alumina (aluminium oxide) in adsorbing the ionic constituents present in the dielectric liquid impregnant.

Tabulated below is a comparison of the effects of talc upon the dissipation factor of unimpregnated capacitor tissue. The comparison is made using 0.00045 inch, 1.0 density, paper containing 2.1% of talc.

TABLE II

| Sample | Percent dissipation factors, temp. (° C.) | | |
|---|---|---|---|
|  | 40 | 100 | 125 |
| Regular capacitor tissue (no adsorbent) | 0.176 | 0.158 | 0.185 |
| Talc | 0.172 | 0.162 | 0.186 |

The following examples are illustrative of the way in which the invention may be practiced and its objective achieved to maximum advantage.

EXAMPLE I

As a control, a capacitor was constructed in the following manner: Capacitor tissue was, prepared using a stock composed of special high purity unbleached Dryden condenser pulp. The paper had a thickness of 0.00045 inch, a density of 0.9, and a dielectric strength of 1400 volts/mil. A capacitor winding was prepared from this paper, using three layers of this tissue as the dielectric between conductive foils, placed in a wrapper within a can, and in usual fashion treated under heat and vacuum, then impregnated with a chlorinated hydrocarbon impregnant (Aroclor 1242). The resultant capacitor when tested at 100° C., using a General Radio 1611A bridge, had a capacitance of 2.15 microfarads and a dissipation factor of 0.65%.

EXAMPLE II

An identical capacitor was made, using capacitor tissue in which talc was added to the stock in an amount equal to 0.16% by weight of the main papermaking fibers. When tested under the same condition, as Example I, the capacitor when made had a dissipation factor of 0.49%.

A sample of this paper was ashed, and was found to have 0.11% talc by weight of the main papermaking fibers, the rest of the talc added to the stock having been lost during formation of the paper.

EXAMPLE III

A capacitor was prepared as in Example II except that the tissue contained 0.9% of talc. The capacitor had a dissipation factor of 0.38%.

EXAMPLE IV

A capacitor was made as in Example II except that the tissue contained talc in an amount equal to 1.2% of the weight of the wood pulp fibers. It was similarly tested and manifested a dissipation factor of 0.28%.

EXAMPLE V

A capacitor was prepared as in Example II except that the tissue contained talc in an amount equal to 2.6% of the weight of the wood pulp fibers. It was similarly tested and manifested a dissipation factor of 0.28%.

EXAMPLE VI

A capacitor was made, as in the above examples, with tissue containing 7.8% of the talc. The capacitor had a dissipation factor of 0.29%.

These examples show that the desired effect is manifested when the proportion of talc is in the lower part of the useful range between about 0.1% and 8%, and that the optimum effect is achieved in the range between 1.2% and 2.6% of the talc present. When the amount of talc exceeds about 8% by weight of the base paper making fibers, no appreciable gain in scavenging effect is observed, and in fact unacceptable impairment of the dielectric strength tends to occur.

In the drawing, foil electrodes 10 of a wound capacitor body are shown separated by paper sheets 11, each electrode being provided with a terminal 12.

The talc may be present in any one or more of the tissue spacing layers 11.

It may also, (or alternatively) be present in the wrapper which surrounds the wound condenser body and lying between it and the can. In such a case, the dielectric strength is not so important, and the maximum useful proportion of talc is limited by the deterioration, in tensile strength which it brings about.

EXAMPLE VII

As a control, six capacitors were made using in each case two sheets of capacitor tissue between foil electrodes, the tissue having a thickness of 0.00025 inch, a density of 1.0 and a dielectric strength of 2,150 volts per mil. Each wound condenser body was enclosed in a wrapper of regular 0.003 inch kraft paper. After canning, drying and impregnating with Aroclor 1242 the cans were sealed. The capacitors were then heated and tested at 100° C., using a General Radio 1611A bridge. The capacitance and dissipation factor values were found to be 0.96 microfarad and 0.45% respectively. The terminal to case dissipation factor when measured was found to be 1.65% (The latter measurement is an extremely sensitive indication of the relative impurity of the impregnant).

EXAMPLES VIII AND IX

Other capacitors were constructed exactly as described in the above example except that the wrapper was caused to embody varying quantities of talc. Tested and averaged as in the above example the measured values were:

Example VII—Wrapper with 6%, by weight of talc; capacitance 0.98 microfarad; dissipation factor, terminal to terminal 0.35%; dissipation factor terminal to case 0.52%.

Example VIII—Wrapper with 25%, by weight of talc; capacitance 0.96 microfarad; dissipation factor terminal-to-terminal 0.31%, terminal to case 0.50%.

These examples indicate the marked effectiveness of the talc additive, as a scavenger of ionic constituents in the impregnating liquid, when incorporated in the paper wrapper. Higher levels of the talc can be tolerated because the need for dielectric strength is not as stringent. It has been found, however, that the tensile strength of the wrapper falls to an undesirable and commercially unacceptable degree (e.g. from a normal 17.6 kg. per inch to only 8.9 kg. per inch) if the amount of talc exceeds 30% by weight.

The adsorbent can be used, of course, in both the dielectric tissue and the wrapper, if desired. However used, its purification of the impregnating medium leads to a more advantageous service life of the capacitor. Its beneficial effects are not restricted to any specific impregnating medium, but are observable in connection with any organic liquid dielectric impregnant that might carry ions. This includes the numerous chlorinated hydrocarbons which are currently in wide use, and hydrocarbon oil, as well as for example the materials mixed with sulfones.

The invention has been shown and described in pre-

What is claimed is:

1. An electrical capacitor of improved aging and dissipation factor characteristics, comprising at least two electrodes with paper interposed between said electrodes, said paper being impregnated with a dielectric liquid, and said paper comprising cellulosic papermaking fibers and a scavenging additive for adsorbing organic constituents in said liquid impregnant, said scavenging additive being talc present in an amount between 0.1% and 8% by weight of the cellulosic papermaking fibers.

2. An electrical capacitor of improved aging and dissipation factor characteristics comprising at least two electrodes with paper interposed between said electrodes, said paper being impregnated with a dielectric liquid, said electrodes comprising strips of conductive foil which are interwound with strips of said paper to form a wound capacitor body, a paper wrapper enclosing said body, said paper comprising cellulose papermaking fibers and a scavenging additive for adsorbing organic constituents in said liquid impregnant, said scavenging additive being talc present in an amount between 6% and 30% by weight of the cellulosic papermaking fibers of said wrapper.

References Cited

UNITED STATES PATENTS 3,321,689   4/1967   Reynolds _____ 317—259X

ELLIOT A. GOLDBERG, Primary Examiner

U.S. Cl. X.R.

162—138